US012687257B2

(12) United States Patent
Shin

(10) Patent No.: US 12,687,257 B2
(45) Date of Patent: Jul. 21, 2026

(54) VEHICLE REFUELING SYSTEM AND METHOD

(71) Applicants: HYUNDAI MOTOR COMPANY, Seoul (KR); KIA CORPORATION, Seoul (KR)

(72) Inventor: Ye Eun Shin, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/653,373

(22) Filed: May 2, 2024

(65) Prior Publication Data

US 2024/0377030 A1     Nov. 14, 2024

(30) Foreign Application Priority Data

May 10, 2023     (KR) ......................... 10-2023-0060601

(51) Int. Cl.
F17C 5/00          (2006.01)
B60S 5/02          (2006.01)
(52) U.S. Cl.
CPC ................ F17C 5/007 (2013.01); B60S 5/02 (2013.01); *F17C 2205/0326* (2013.01); (Continued)
(58) Field of Classification Search
CPC .............. F17C 5/007; F17C 2205/0326; F17C 2205/037; F17C 2221/012; F17C 2250/034; F17C 2250/043; F17C 2250/0443; F17C 2250/0636; F17C 2265/065; F17C 2270/0178; B60S 5/02
(Continued)

(56) References Cited

U.S. PATENT DOCUMENTS

2016/0305611 A1 * 10/2016 Handa ...................... F17C 5/06
2018/0266633 A1     9/2018 Fujita
(Continued)

FOREIGN PATENT DOCUMENTS

CN          111120855 A      5/2020
JP          3855983 B2      9/2006
(Continued)

OTHER PUBLICATIONS

KR20220121960A—English translation (Year: 2022).*

*Primary Examiner* — Christopher M Afful
(74) *Attorney, Agent, or Firm* — Lempia Summerfield Katz LLC

(57) ABSTRACT

A vehicle refueling system and a vehicle refueling method are provided. The vehicle refueling system includes a plurality of refueling hoses connected with a plurality of nozzles fastened with a vehicle, a plurality of flow control valves installed in the plurality of refueling hoses, and a refueling controller that controls the plurality of flow control valves. The refueling controller determines any one of a plurality of refueling modes based on characteristic information of the vehicle and available information of the plurality of nozzles, determines a refueling speed and target pressure of a fuel tank of the vehicle based on the determined refueling mode, and adjusts opening rates of the plurality of flow control valves based on the determined refueling speed and the determined target pressure.

16 Claims, 6 Drawing Sheets

(52) U.S. Cl.
CPC .. *F17C 2205/037* (2013.01); *F17C 2221/012*
(2013.01); *F17C 2250/034* (2013.01); *F17C*
*2250/043* (2013.01); *F17C 2250/0443*
(2013.01); *F17C 2250/0636* (2013.01); *F17C*
*2265/065* (2013.01); *F17C 2270/0178*
(2013.01)

(58) Field of Classification Search
USPC ............................................................ 141/1
See application file for complete search history.

(56) References Cited

U.S. PATENT DOCUMENTS

| | | |
|---|---|---|
| 2021/0116073 A1 | 4/2021 | Lee |
| 2022/0136655 A1* | 5/2022 | Pollica ..................... B67D 7/80 |
| 2023/0204159 A1 | 6/2023 | Werlen |

FOREIGN PATENT DOCUMENTS

| | | | |
|---|---|---|---|
| JP | 2010169180 A | 8/2010 | |
| KR | 20200104441 A | 9/2020 | |
| KR | 102364880 B1 | 2/2022 | |
| KR | 20220037573 A | 3/2022 | |
| KR | 20220121960 A * | 9/2022 | ............ F17C 13/025 |

* cited by examiner

VEHICLE REFUELING SYSTEM AND METHOD

CROSS-REFERENCE TO RELATED APPLICATION

This application claims the benefit of and priority to Korean Patent Application No. 10-2023-0060601, filed in the Korean Intellectual Property Office on May 10, 2023, the entire contents of which are incorporated herein by reference.

TECHNICAL FIELD

The present disclosure relates to a vehicle refueling system and method. More particularly, the present disclosure relates to a vehicle refueling system for refueling a vehicle in an appropriate refueling mode depending to a type of the vehicle and a vehicle refueling method.

BACKGROUND

A representative hydrogen fuel cell in a fuel cell electric vehicle (FCEV) electrochemically generates electricity using oxygen and hydrogen in the stack and directly converts the chemical energy into electrical energy to use as a power source. Such a hydrogen fuel cell vehicle is an ideal technology that is highly efficient and emits almost no pollutants because it is able to receive fuel and air from the outside to continue generating power regardless of cell capacity. Many attempts to develop the hydrogen fuel cell vehicle are currently in progress.

A hydrogen refueling station may be installed at a required location, such as the periphery of a road, to refuel the hydrogen fuel cell vehicle with hydrogen which is the power source. Hydrogen stored in the hydrogen refueling station may be supplied to the vehicle through a refueling nozzle of a dispenser disposed at the hydrogen refueling station and may be refueled in a fuel tank of the vehicle.

There may be various types of hydrogen fuel cell vehicles depending on certain characteristics (e.g., a fuel accommodation method, the amount of fuel accommodation, and the like) of the vehicle. However, the hydrogen refueling station supplies hydrogen to the vehicle without regard to the type of vehicle.

SUMMARY

The present disclosure has been made to solve the above-mentioned problems occurring in the prior art while advantages achieved by the prior art are maintained intact.

An aspect of the present disclosure provides a vehicle refueling system for refueling a vehicle in an appropriate refueling mode with regard to a characteristic of the vehicle and a refueling situation. Additionally, a vehicle refueling method thereof is provided.

Another aspect of the present disclosure provides a vehicle refueling system for refueling a vehicle at a high speed and simultaneously refueling a plurality of vehicles. Additionally, a vehicle refueling method thereof is provided.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle refueling system is provided. The system may include: a plurality of refueling hoses connected with a plurality of nozzles configured to be fastened to a vehicle; a plurality of flow control valves installed in the plurality of refueling hoses; and a refueling controller that controls the plurality of flow control valves. The refueling controller may determine any one of a plurality of refueling modes based on characteristic information of the vehicle and available information of the plurality of nozzles. The refueling controller may determine a refueling speed and a target pressure of a fuel tank of the vehicle based on the determined refueling mode. Additionally, the refueling controller may adjust opening rates of the plurality of flow control valves based on the determined refueling speed and the determined target pressure.

In an embodiment, the plurality of flow control valves may include a plurality of valves respectively arranged on the plurality of refueling hoses to control flow rates of the plurality of refueling hoses. The plurality of flow control valves may also include an integrated valve that controls a flow rate of a supply pipe disposed between the plurality of valves and fuel storage.

In an embodiment, the characteristic information of the vehicle may include: a number of receptacles fastened with at least any one of the plurality of nozzles; and a number of refueling modules arranged between the fuel tank of the vehicle and the number of receptacles. The refueling controller may determine a refueling mode as a single refueling mode, when it is recognized that each of the number of the receptacles and the number of the refueling modules is greater than or equal to at least one and it is determined that the number of available nozzles is one. The refueling controller may also determine the refueling mode as a first multi-refueling mode, when it is recognized that the number of the receptacles is plural and the number of the refueling modules is less than the number of the receptacles and it is determined that the number of the available nozzles is plural. The controller may also determine the refueling mode as a second multi-refueling mode, when it is determined that each of the number of receptacles and the number of the refueling modules is plural and that the number of the available nozzles is plural.

In an embodiment, the vehicle refueling system may further include an interface disposed around each of the plurality of refueling hoses to provide a screen capable of selecting icons respectively corresponding to the single refueling mode, the first multi-refueling mode, and the second multi-refueling mode.

In an embodiment, the refueling controller may determine the refueling speed and the target pressure of the fuel tank of the vehicle based on a refueling mode corresponding to the selected icon, when it is determined that the icon corresponding to any one of the single refueling mode, the first multi-refueling mode, or the second multi-refueling mode is selected through the interface. The refueling controller may also adjust the opening rates of the plurality of flow control valves based on the determined refueling speed and the determined target pressure.

In an embodiment, the vehicle refueling system may further include communication devices respectively installed in the plurality of nozzles. The refueling controller may obtain the characteristic information of through vehicle the communication devices. Additionally, the refueling controller may obtain the available information based on a state in which the number of receptacles of the vehicle and the plurality of nozzles are fastened with each other.

In an embodiment, the vehicle refueling system may further include a plurality of pressure sensors installed in the plurality of refueling hoses, respectively, and a plurality of flow sensors installed in the plurality of refueling hoses, respectively. The refueling controller may detect at least any one of a pressure or a flow rate of each of the plurality of refueling hoses by at least any one of the plurality of pressure sensors or the plurality of flow sensors.

In an embodiment, the refueling controller may control the integrated valve to be closed, when any one of a pressure difference or a flow difference between the plurality of refueling hoses is greater than or equal to a reference value when refueling the vehicle in the first multi-refueling mode.

In an embodiment, the refueling controller may control any one of the plurality of valves to close a valve connected to the vehicle among the plurality of valves, when there is a need to stop refueling the vehicle while refueling the vehicle in the single refueling mode. The refueling controller may control the integrated valve to be closed, when there is a need to stop refueling the vehicle while refueling the vehicle in the first multi-refueling mode. Additionally, the refueling controller may control the plurality of valves to be closed, when there is a need to stop refueling the vehicle while refueling the vehicle in the second multi-refueling mode.

According to another aspect of the present disclosure, a vehicle refueling method is provided. The vehicle refueling method may include determining a refueling mode of a plurality of refueling modes based on characteristic information of a vehicle and available information of a plurality of nozzles fastened to the vehicle. The vehicle refueling method may also include: determining a refueling speed and a target pressure of a fuel tank of the vehicle based on the determined refueling mode; and adjusting opening rates of a plurality of flow control valves installed in a plurality of refueling hoses connected with the plurality of nozzles based on the determined refueling speed and the determined target pressure.

In an embodiment, the adjusting of the opening rates of the plurality of flow control valves may include adjusting opening rates of a plurality of valves respectively arranged on the plurality of refueling hoses. The plurality of valves may be configured to control flow rates of the plurality of refueling hoses. Additionally, the adjusting of the opening rates of the plurality of flow control valves may include adjusting an opening rate of an integrated valve configured to control a flow rate of a supply pipe disposed between the plurality of valves and fuel storage.

In an embodiment, the determining of the any one of the plurality of refueling modes may include determining the refueling mode as a single refueling mode, when it is recognized that each of the number of receptacles of the vehicle and the number of refueling modules of the vehicle is greater than or equal to at least one and it is determined that the number of available nozzles is one. The determining of the any one of the plurality of refueling modes may include determining the refueling mode as a first multi-refueling mode, when it is recognized that the number of the receptacles is plural and the number of the refueling modules is less than the number of the receptacles and it is determined that the number of the available nozzles is plural. Additionally, the determining of the any one of the plurality of refueling modes may include determining the refueling mode as a second multi-refueling mode, when it is determined that each of the number of the receptacles and the number of the refueling modules is plural and that the number of the available nozzles is plural.

In an embodiment, the adjusting of the opening rates of the plurality of flow control valves may include determining the refueling speed and the target pressure of the fuel tank of the vehicle based on a refueling mode corresponding to a selected icon, when it is determined that an icon corresponding to any one of the single refueling mode, the first multi-refueling mode, or the second multi-refueling mode is selected through an interface disposed around each of the plurality of refueling hoses. Additionally, the adjusting of the opening rates of the plurality of flow control valves may include adjusting the opening rates of the plurality of flow control valves based on the determined refueling speed and the determined target pressure.

In an embodiment, the determining of the any one of the plurality of refueling modes may include: obtaining the characteristic information of the vehicle through communication devices respectively installed in the plurality of nozzles; and obtaining the available information based on a state in which the number of receptacles of the vehicle and the plurality of nozzles are fastened with each other.

In an embodiment, the vehicle refueling method may further include controlling the integrated valve to be closed, when any one of a pressure difference or a flow difference between the plurality of refueling hoses is greater than or equal to a reference value upon refueling the vehicle in the first multi-refueling mode.

In an embodiment, the vehicle refueling method may further include controlling any one of the plurality of valves to close a valve connected to the vehicle among the plurality of valves, when there is a need to stop refueling the vehicle while refueling the vehicle in the single refueling mode. The vehicle refueling method may also include controlling the integrated valve to be closed, when there is a need to stop refueling the vehicle while refueling the vehicle in the first multi-refueling mode. Additionally, the vehicle refueling method may include controlling the plurality of valves to be closed, when there is a need to stop refueling the vehicle while refueling the vehicle in the second multi-refueling mode.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
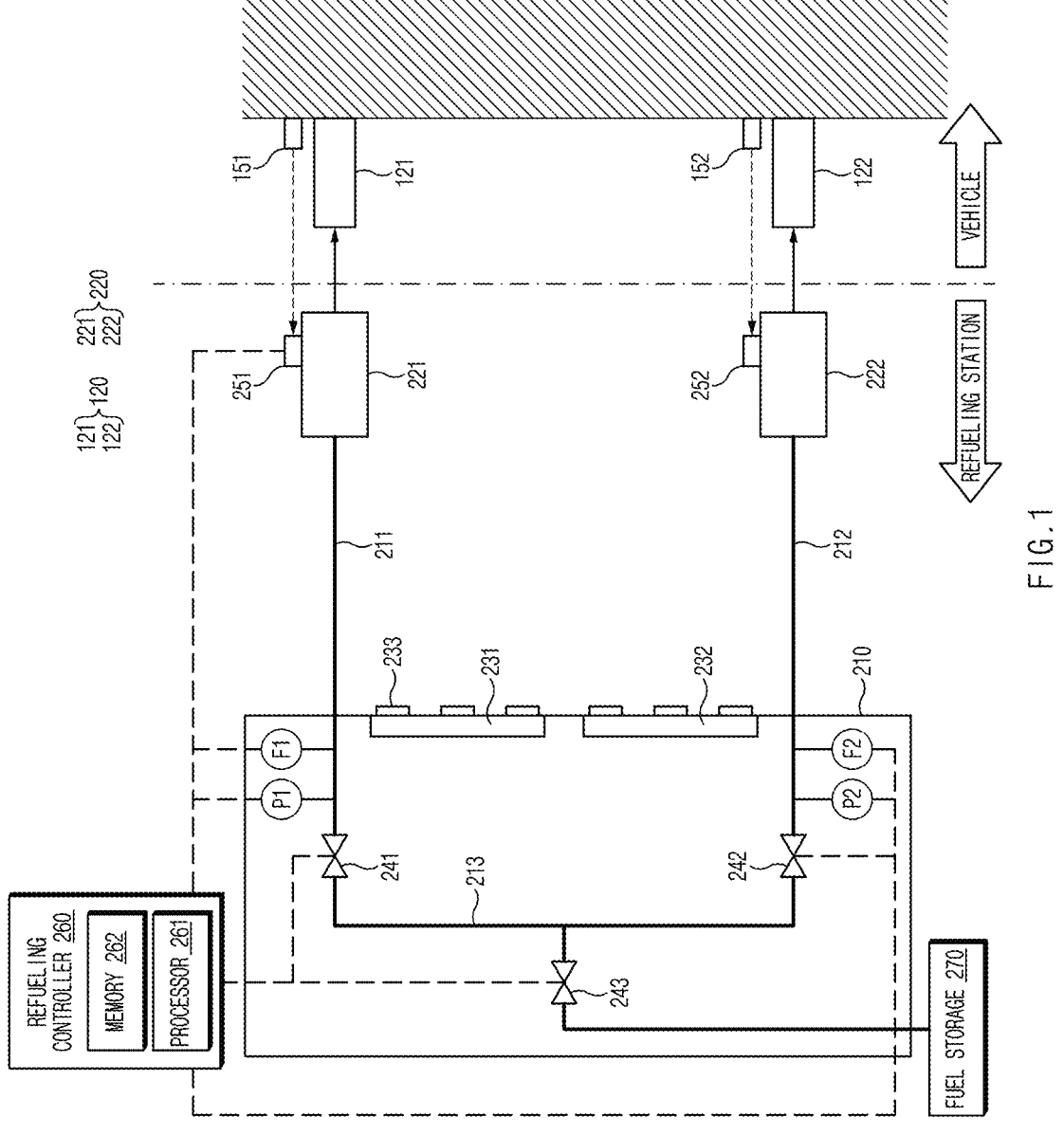
FIG. 1 is a drawing illustrating a configuration of a vehicle refueling system according to an embodiment of the present disclosure.

Hereinafter, embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein have the same meaning as being generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

Hereinafter, the embodiments of the present disclosure are described in detail with reference to FIGS. 1-6.

FIG. 1 is a drawing illustrating a configuration of a vehicle refueling system according to an embodiment of the present disclosure.

Referring to FIG. 1, the vehicle refueling system according to an embodiment of the present disclosure may be a vehicle refueling system capable of supplying fuel of a refueling station to a vehicle. The refueling system according to an embodiment of the present disclosure may include a dispenser 210, a refueling controller 260, and a fuel storage 270.

The fuel storage 270 may store fuel. The stored fuel may be delivered to the vehicle through the dispenser 210. For example, the fuel may be hydrogen in the form of at least one of a gas, liquid, or liquid organic hydrogen carriers (LOHC). The range of the fuel is not limited to only hydrogen, which may change in the range of being easy for those having ordinary skill in the art. Hereinafter, a description is given of an example in which fuel is hydrogen.

The at least one dispenser 210 may be arranged in a refueling station. The dispenser 210 may include a plurality of nozzles 220, a plurality of refueling hoses 211 and 212, a plurality of flow control valves 241, 242, and 243, and a plurality of interfaces 231 and 232.

Each of the plurality of nozzles 220 may be fastened with a receptacle 120 of the vehicle. At least any one of the plurality of nozzles 220 may be fastened with the at least one receptacle 120 connected with at least any one fuel tank. As an example, any one of the plurality of nozzles 220 may be fastened with the single receptacle 120 of the vehicle including a single tank. As another example, any one of the plurality of nozzles 220 may be fastened with any one of the plurality of receptacles 120 of the vehicle including a plurality of fuel tanks. As another example, the plurality of nozzles 220 may be fastened one-to-one with the plurality of receptacles 120 of the vehicle including a plurality of fuel tanks.

The plurality of nozzles 220 may include a first nozzle 221 and a second nozzle 222. Each of the first nozzle 221 and the second nozzle 222 may be connected with the receptacle 120 disposed on the vehicle. The first nozzle 221 may be disposed at an end portion of the first refueling hose 211, and the second nozzle 222 may be disposed at an end portion of the second refueling hose 212.

First communication devices 251 and 252 may be formed at one side of the first nozzle 221 and the second nozzle 222, respectively. For example, the first communication devices 251 and 252 may include a wired communication device and/or a wireless communication device. The first communication devices 251 and 252 may include a transmission device and/or a reception device. As an example, the first communication devices 251 and 252 may include an infrared (IR) receiver. When the vehicle is refueled, the first communication devices 251 and 252 may perform data communication with second communication devices 151 and 152 arranged around the respective receptacles 121 and 122 coupled to the corresponding nozzles 221 and 222. For example, the second communication devices 151 and 152 may include a wired communication device and/or a wireless communication device. The second communication devices 151 and 152 may include a transmission device and/or a reception device. As an example, the second communication devices 151 and 152 may include an IR transmitter. The first communication devices 251 and 252 communicatively connected with the second communication devices 151 and 152 may receive characteristic information of the vehicle from the vehicle. The characteristic information of the vehicle may be fuel refueling information including a tank temperature of the vehicle, tank pressure of the vehicle, the number of receptacles, the number of refueling modules, a refueling pressure, a tank size, and refueling speed information.

The first refueling hose 211 may be disposed between a supply pipe 213 connected with the fuel storage 270 and the first nozzle 221 to connect the fuel storage 270 and the first nozzle 221. The first refueling hose 211 may include a first pressure sensor P1 and a first flow sensor F1. The first pressure sensor P1 may measure the internal pressure of the first refueling hose 211 and/or the pressure of fuel supplied to the first nozzle 221 through the first refueling hose 211. The first flow sensor F1 may measure a flow rate of fuel supplied to the first nozzle 221 through the first refueling hose 211.

The second refueling hose 212 may be disposed between a supply pipe 213 connected with the fuel storage 270 and the second nozzle 222 to connect the fuel storage 270 and the second nozzle 222. The second refueling hose 212 may include a second pressure sensor P2 and a second flow sensor F2. The second pressure sensor P2 may measure the internal pressure of the second refueling hose 212 and/or the pressure of fuel supplied to the second nozzle 222 through the second refueling hose 212. The second flow sensor F2 may measure a flow rate of fuel supplied to the second nozzle 222 through the second refueling hose 212.

The interfaces 231 and 232 may be provided as various buttons 233 capable of being selected by a user of the vehicle, a touch screen, and the like. The interfaces 231 and 232 may provide (or output) a screen capable of selecting a refueling mode, refueling start, refueling stop, and the like.

For example, the interfaces 231 and 232 may provide a screen displaying an icon capable of selecting a refueling mode suitable for the vehicle based on the characteristic information of the vehicle and available information of a nozzle among a single refueling mode, a first multi-refueling mode, or a second refueling mode.

The interfaces 231 and 232 are described as being plural in number, but may be configured as one interface into which the plurality of interfaces are integrated.

The first multi-refueling mode may be a refueling mode suitable for refueling a first multi-receptacle vehicle, including a smaller number of refueling modules than the plurality of receptacles, at a high speed. The second multi-refueling mode may be a refueling mode suitable for refueling a second multi-receptacle vehicle, including a plurality of refueling modules corresponding one-to-one to the plurality of receptacles 120, at a high speed. The single refueling mode may be a refueling mode suitable for refueling a single receptacle vehicle, including one receptacle 120 and one refueling module, at a constant speed. The single refueling mode may be selected when the first and second multi-receptacle vehicles are refueled based on the available information of the nozzle. When the first and second multi-receptacle vehicles should be refueled using a smaller number of nozzles than the receptacles 120 of the first and second multi-receptacle vehicles, the single refueling mode may be a refueling mode suitable for refueling the first and second multi-receptacle vehicles at a constant speed.

The characteristic information of the vehicle, which corresponds to a refueling mode selected by a vehicle user through the interfaces 231 and 232, may be provided to the refueling controller 260. Thus, upon non-communication between the vehicle (e.g., the second communication devices 151 and 152) and the refueling station (e.g., the first communication devices 251 and 252), the refueling controller 260 may obtain the characteristic information of the vehicle through the interfaces 231 and 232.

The plurality of flow control valves 241, 242, and 243 may include the first valve 241, the second valve 242, and the integrated valve 243.

The first valve 241 may be disposed between the supply pipe 213 connected with the fuel storage 270 and the first refueling hose 211 to control a flow rate of fuel supplied from the supply pipe 213 to the first refueling hose 211.

The second valve 242 may be disposed between the supply pipe 213 and the second refueling hose 212 to control a flow rate of fuel supplied from the supply pipe 213 to the second refueling hose 212.

The integrated valve 243 may be disposed between the fuel storage 270 and the supply pipe 213 to control a flow rate of fuel supplied from the fuel storage 270 to the supply pipe 213. The integrated valve 243 may distribute fuel from the fuel storage 270 to a portion of the supply pipe 213 facing the first valve 241 and the remaining portion of the supply pipe 213 facing the second valve 242. The integrated valve 243 may distribute and supply fuel from the fuel storage 270 to the first valve 241 and the second valve 242.

The refueling controller 260 may determine any one of the plurality of refueling modes based on the characteristic information of the vehicle and the nozzle availability information. Additionally, the refueling controller 260 may determine and control opening rates of the flow control valves 241, 242, and 243 based on the determined refueling mode.

The refueling controller 260 may obtain characteristic information (e.g., state information of each of the receptacle, the refueling module, and the refueling tank) of the vehicle through at least any one of the interfaces 231 and 232 or the first communication devices 251 and 252.

As an example, when the receptacle 120 (i.e., receptacles 121 and 122) of the vehicle is fastened with the nozzle 220 (i.e., nozzles 221 and 222), the refueling controller 260 may obtain the characteristic information of the vehicle, which is delivered from the second communication devices 151 and 152, through the first communication devices 251 and 252. When the receptacle 120 of the vehicle is fastened with the nozzle 220, the refueling controller 260 may obtain the nozzle availability information through the number of times the receptacle 120 of the vehicle and the nozzle 220 are fastened with each other. The refueling controller 260 may select a refueling mode based on the obtained characteristic information of the vehicle (e.g., a single receptacle vehicle, a first multi-receptacle vehicle, or a second receptacle vehicle) and the nozzle availability information. When the obtained characteristic information of the vehicle is any one of the single receptacle vehicle, the first multi-receptacle vehicle, or the second multi-receptacle vehicle and one nozzle is available, the refueling controller 260 may select the single refueling mode. When the obtained characteristic information of the vehicle is the first multi-receptacle vehicle and a plurality of nozzles are available, the refueling controller 260 may select the first multi-refueling mode. When the obtained characteristic information of the vehicle is the second multi-receptacle vehicle and the plurality of nozzles are available, the refueling controller 260 may select the second multi-refueling mode.

As another example, the refueling controller 260 may determine whether to activate an icon displayed on an interface based on the nozzle availability information which varies with a vehicle that is being refueled in real-time at the refueling station. When the one nozzle is available, the refueling controller 260 may control the interfaces 231 and 232 such that an icon corresponding to the single refueling mode is activated. When the plurality of nozzles is available, the refueling controller 260 may control the interfaces 231 and 232 such that icons respectively corresponding to the first and second multi-refueling modes are activated. When the user of the vehicle selects an icon corresponding to any one of the single refueling mode, the first multi-refueling mode, or the second refueling mode through the interfaces 231 and 232, the refueling controller 260 may determine a refueling mode corresponding to the selected icon.

The refueling controller 260 may determine a refueling speed and target pressure based on the determined refueling mode. Additionally, the refueling controller 260 may determine and control opening rates of the flow control valves 241, 242, and 243 based on the determined refueling speed and the determined target pressure.

Such a refueling controller 260 may include a processor 261 and a memory 262. The processor 261 may control the overall operation of the refueling controller 260. The processor 261 may be implemented as at least one of an application specific integrated circuit (ASIC), a digital signal processor (DSP), programmable logic devices (PLD), field programmable gate arrays (FPGAs), a central processing unit (CPU), microcontrollers, or microprocessors. The memory 262 may be a non-transitory storage medium that stores instructions executed by the processor 261. The memory 262 may be implemented as at least one of a storage media (or recording media) such as a flash memory, a hard disk, a random access memory (RAM), a static RAM (SRAM), a read-only memory (ROM), a programmable ROM (PROM), an electrically erasable and programmable ROM (EEPROM), an erasable and programmable ROM (EPROM), or a register. For example, the memory 262 may store a map in which opening rates of the flow control valves 241, 242, and 243 are defined based on pieces of state information of the dispenser 210. The pieces of state information are measured by the pressure sensors P1 and P2 or the flow sensors F1 and F2. The memory 262 may store a refueling map in which a hydrogen refueling injection speed and a target pressure based on a refueling mode and a refueling environment of the vehicle are defined.

The refueling controller 260 may adjust an opening rate of the integrated valve 243 to control a flow rate of fuel supplied to the supply pipe 213. The refueling controller 260 may adjust an opening rate of the first valve 241 to control a flow rate of fuel supplied to the first refueling hose 211. The refueling controller 260 may adjust an opening rate of the second valve 242 to control a flow rate of fuel supplied to the second refueling hose 212.

When refueling the vehicle in the single refueling mode or the second multi-refueling mode, the refueling controller 260 may adjust both an opening rate of the first valve 241 and an opening rate of the second valve 242. In other words, the refueling controller 260 may adjust the opening rate of the first valve 241 based on information obtained by any one of the first pressure sensor P1 or the first flow sensor F1. Additionally, the refueling controller 260 may adjust the opening rate of the second valve 242 based on information obtained by any one of the second pressure sensor P2 or the second flow sensor F2.

When refueling the vehicle in the first multi-refueling mode, the refueling controller 260 may control the integrated valve 243, such that operation timing between the first and second nozzles 221 and 222 and/or operation timing between the first and second refueling hoses 211 and 212 are/is identical to each other, thus preventing flow imbalance from occurring.

The refueling controller 260 may obtain state information of the dispenser 210 (e.g., pieces of flow information of refueling hoses) using at least any one of the plurality of pressure sensors P1 and P2 or the plurality of flow sensors F1 and F2. The refueling controller 260 may determine whether flow imbalance of the plurality of refueling hoses 211 and 212 occurs based on the obtained information and may control opening rates of the flow control valves 241, 242, and 243 based on the determined result.

When refueling the vehicle in the first multi-refueling mode, the refueling controller 260 may calculate a pressure difference value between the first and second nozzles 221 and 222 and/or between the first and second refueling hoses 211 and 212 through information obtained by the first and second pressure sensors P1 and P2. When refueling the vehicle in the first multi-refueling mode, the refueling controller 260 may calculate a flow difference value between the first and second nozzles 221 and 222 and/or between the first and second refueling hoses 211 and 212 through information obtained by the first and second pressure sensors F1 and F2. While refueling the vehicle in the first multi-refueling mode, when the calculated pressure difference value and/or the calculated flow difference value are/is greater than or equal to a predetermined reference value, the refueling controller 260 may control the integrated valve 243 to be temporarily closed. Thus, the refueling controller 260 may synchronize pressure between the first and second nozzles 221 and 222 and/or pressure between the first and second refueling hoses 211 and 212. Internal pressure between the first and second nozzles 221 and 222 and/or internal pressure between the first and second hoses 211 and 212 may be uniformly formed as the same pressure. The flow rate of fuel supplied through the first and second nozzles 221 and 222 and/or the flow rate of fuel supplied through the first and second refueling hoses 211 and 212 may be evenly matched with each other.

When the situation in which refueling should be stopped occurs while refueling the vehicle, the refueling controller 260 may control the first valve 241, the second valve 242, and the integrated valve 243 such that at least any one of the first valve 241, the second valve 242, or the integrated valve 243 is fully closed. When the situation in which refueling should be stopped occurs while refueling the vehicle in the first multi-refueling mode, the refueling controller 260 may control the integrated valve 243. When the situation in which refueling should be stopped occurs while refueling the vehicle in the single refueling mode or the second multi-refueling mode, the refueling controller 260 may control at least any one of the first valve 241 or the second valve 242 installed on the at least one refueling hose 211 and 212 connected with the vehicle. Therefore, because refueling is stopped in an emergency situation or a situation in which refueling is difficult, stability may be secured. For example, the situation in which the refueling should be stopped may be a situation when the bank of the fuel storage 270 is replaced, when a problem with at least any one of the fuel tank of the vehicle or a refueling station occurs, or when receiving a refueling stop signal through the first communication devices 251 and 252.

Figure 2:
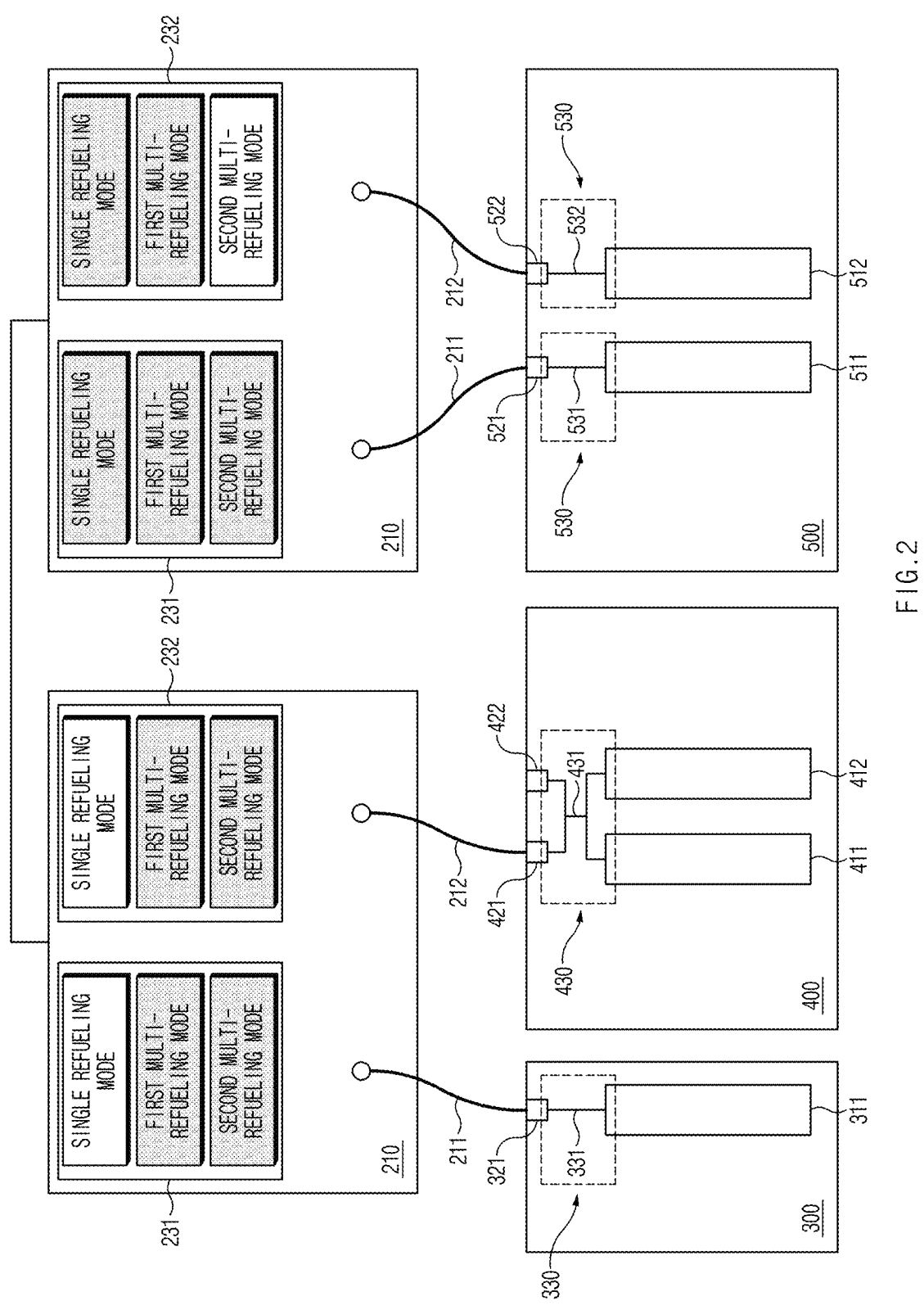
FIG. 2 is a drawing describing a vehicle refueling method using a refueling system according to an embodiment of the present disclosure.

FIG. 2 is a drawing describing a vehicle refueling method using a refueling system according to an embodiment of the present disclosure.

Referring to FIG. 2, vehicles 300, 400, and 500 may be divided based on a fuel reception method and an amount of fuel storage. The vehicles 300, 400, and 500 may be divided into the first vehicle 300, the second vehicle 400, and the third vehicle 500. Fuel tanks 311, 411, 412, 511, and 512 included in the vehicles 300, 400, and 500 may be one fuel tank or a plurality of fuel tanks.

The first vehicle 300 may be a single receptacle vehicle including one first receptacle 321 and one first refueling module 330. The second vehicle 400 may be a first multi-receptacle vehicle including a smaller number of second refueling modules 430 than a plurality of second receptacles 421 and 422. The third vehicle 500 may be a second multi-receptacle vehicle including a plurality of third refueling modules 530 corresponding one-to-one to a plurality of third receptacles 521 and 522 and a plurality of third refueling tanks 511 and 512.

The first vehicle 300 which is the single receptacle vehicle may include the first refueling module 330 located between the first receptacle 321 and the first fuel tank 311. The first refueling module 330 may include one (or single) first refueling flow path 331 connected with the first receptacle 321.

The first vehicle 300 may be refueled with hydrogen fuel at a constant speed through a dispenser 210 which operates in a single refueling mode. When an icon corresponding to the single refueling mode of at least any one of a first interface 231 or a second interface 232 is activated, a user of the first vehicle 300 may select the single refueling mode. Any one of a first refueling hose 211 or a second refueling hose 212 of the dispenser 210 which operates in the single refueling mode may be fastened with the first receptacle 321 of the first vehicle 300. Hydrogen fuel may be supplied to the first vehicle 300 through any one of the first refueling hose 211 or the second refueling hose 212 fastened with the first receptacle 321. The hydrogen fuel may be stored in the first fuel tank 311 through the first refueling flow path 331 of the first refueling module 330 connected with the first receptacle 321.

The second vehicle 400 which is the first multi-receptacle vehicle may include the plurality of second receptacles 421 and 422, a plurality of second fuel tanks 411 and 412, and at least one second refueling module 430. The second receptacles 421 and 422 and the second fuel tanks 411 and 412 may be the same in number, but the second fuel tanks 411 and 412 may be greater in number than the second receptacles 421 and 422.

The second refueling module 430 may include at least one refueling flow path 431 arranged between the plurality of second receptacles 421 and 422 and the plurality of second fuel tanks 411 and 412. The second refueling module 430 may branch and supply hydrogen fuel through the one refueling flow path 431 connected with each of the plurality of second receptacles 421 and 422 to each of the plurality of second fuel tanks 411 and 412.

Hydrogen fuel may be supplied to the second vehicle 400 through the dispenser 210 which operates in any one of the single refueling mode or a first multi-refueling mode.

When icons corresponding to the single refueling mode, the first multi-refueling mode, and the second multi-refueling mode of at least any one of the first interface 231 or the second interface 232 are activated, a user of the second vehicle 400 may select the first multi-refueling mode. The first and second refueling hoses 211 and 212 of the dispenser 210 which operates in the first multi-refueling mode may be fastened with the plurality of second receptacles 421 and 422. The second vehicle 400 may be refueled with hydrogen fuel at a high speed through the first and second refueling hoses 211 and 212 fastened with the plurality of receptacles 421, and 422.

When the icons of the first multi-refueling mode and the second multi-refueling mode of the first and second interfaces 231 and 232 are deactivated and the icon of the single refueling mode is activated, the user of the second vehicle 400 may select the single refueling mode. Any one of the first refueling hose 211 or the second refueling hose 212 of the dispenser 210 which operates in the single refueling mode may be fastened with any one of the plurality of second receptacles 421 and 422. The remaining one of the first refueling hose 211 or the second refueling hose 212 may fail to be fastened with the remaining one of the plurality of second receptacles 421 and 422. The second vehicle 400 may be refueled with hydrogen at a constant speed through the any one of the first refueling hose 211 or the second refueling hose 212, which is fastened with the any one of the plurality of second receptacles 421 and 422.

For example, when the first vehicle 300 is refueled with hydrogen fuel at a constant speed in the single refueling mode through the first refueling hose 211, the second vehicle 400 may be refueled at a constant speed with hydrogen fuel in the single refueling mode through the second refueling hose 212 of the same dispenser 210 as the first vehicle 300. Therefore, the first vehicle 300 which is the single receptacle vehicle and the second vehicle 400 which is the first multi-receptacle vehicle may be refueled at the same time.

The third vehicle 500 which is the second multi-receptacle vehicle may include the plurality of third receptacles 521 and 522, the plurality of third fuel tanks 511 and 512, and the plurality of third refueling modules 530. The third refueling modules 530, the third receptacles 521 and 522, and the third fuel tanks 511 and 512 may be the same in number. The plurality of third refueling modules 530 may be connected one-to-one with the plurality of third receptacles

521 and 522 and the plurality of third fuel tanks 511 and 512. The plurality of third refueling modules 530 may include a plurality of refueling flow paths 531 and 532 arranged between the plurality of third receptacles 521 and 522 and the plurality of third fuel tanks 511 and 512, respectively.

Hydrogen fuel may be supplied to the third vehicle 500 through the dispenser 210 which operates in any one of the single refueling mode or the second multi-refueling mode.

When the icons corresponding to the single refueling mode, the first multi-refueling mode, and the second multi-refueling mode of at least any one of the first interface 231 or the second interface 232 are activated, a user of the third vehicle 500 may select the icon corresponding to the second multi-refueling mode. The first and second refueling hoses 211 and 212 of the dispenser 210 which operates in the second multi-refueling mode may be fastened with the plurality of third receptacles 521 and 522. The third vehicle 500 may be refueled with hydrogen fuel at a high speed through the first and second refueling hoses 211 and 212 fastened with the plurality of receptacles 521, and 522.

When the icons of the first multi-refueling mode and the second multi-refueling mode of the first and second interfaces 231 and 232 are deactivated and the icon of the single refueling mode is activated, the user of the third vehicle 500 may select the single refueling mode. Any one of the first refueling hose 211 or the second refueling hose 212 of the dispenser 210 which operates in the single refueling mode may be fastened with any one of the plurality of third receptacles 521 and 522. The remaining one of the first refueling hose 211 or the second refueling hose 212 may fail to be fastened with the remaining one of the plurality of third receptacles 521 and 522. The third vehicle 500 may be refueled with hydrogen fuel at a constant speed through the any one of the first refueling hose 211 or the second refueling hose 212, which is fastened with the any one of the plurality of third receptacles 521 and 522.

For example, when the first vehicle 300 is refueled with hydrogen fuel at the constant speed in the single refueling mode through the first refueling hose 211, the third vehicle 500 may be refueled with hydrogen fuel at the constant speed in the single refueling mode through the second refueling hose 212 of the same dispenser 210 as the first vehicle 300. Therefore, the first vehicle 300 which is the single receptacle vehicle and the third vehicle 500 which is the second multi-receptacle vehicle may be refueled at the same time.

Hereinafter, a description is given for an operation method of a refueling system according to an embodiment of the present disclosure with reference to FIGS. 3 and 5. A description is also given for a refueling method of the refueling system shown in FIGS. 3-5 in conjunction with FIGS. 1 and 2.

Hereinafter, it is assumed that a refueling system of FIG. 1 performs processes of FIGS. 3-5. Furthermore, in descriptions of FIGS. 3-5, an operation described as being performed by a device may be understood as being controlled by a refueling controller 260 of the refueling system.

Figure 3:
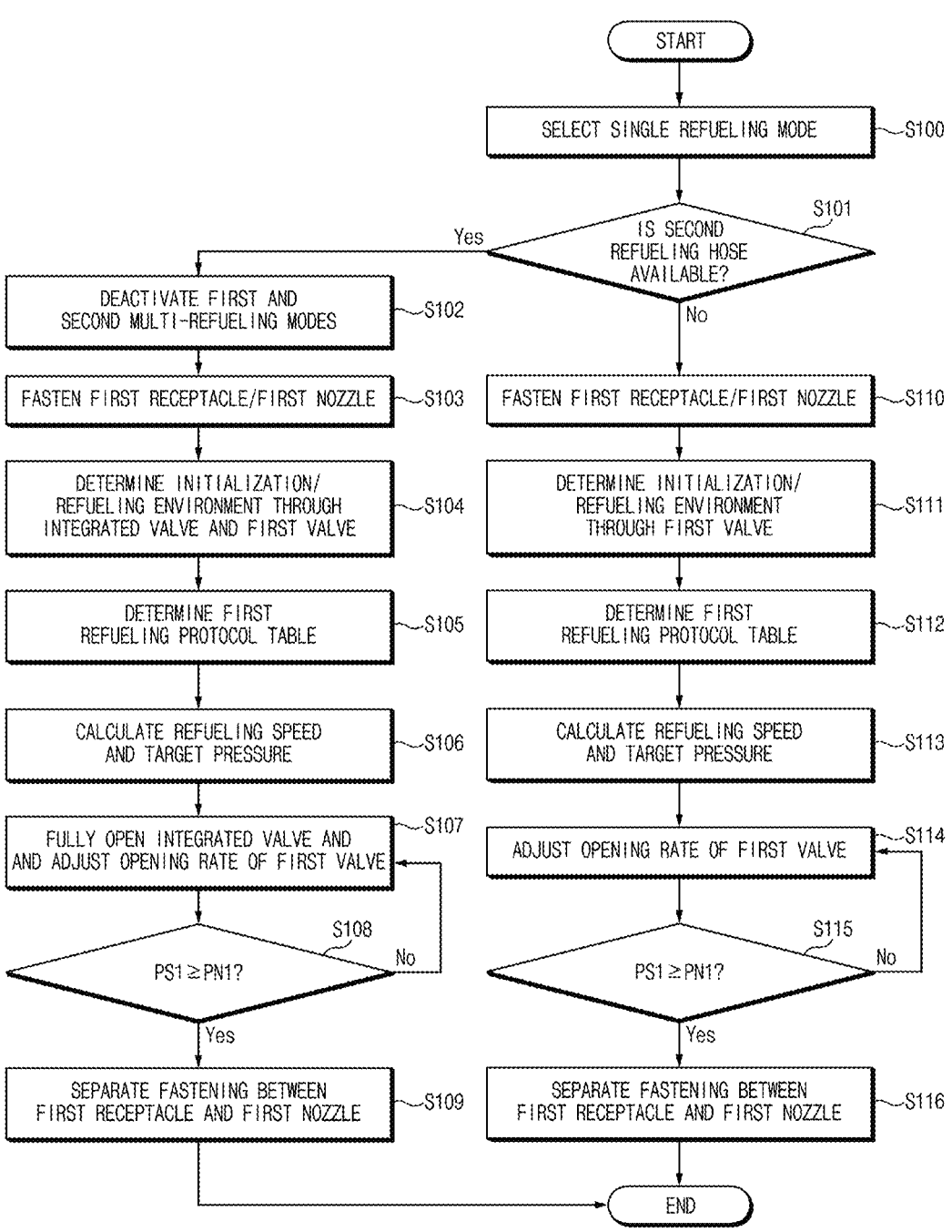
FIG. 3 is a flowchart illustrating a refueling method of a refueling system for operating in a single refueling mode according to an embodiment of the present disclosure.

FIG. 3 is a flowchart illustrating a refueling method of a refueling system for operating in a single refueling mode according to an embodiment of the present disclosure.

In S100, as a user of a first vehicle 300 which is a single receptacle vehicle selects a single refueling mode on any one of a first interface 231 or a second interface 232, a dispenser 210 may operate in the single refueling mode. For example, the user of the first vehicle 300 may select the single refueling mode of the first interface 231.

In S101, a refueling controller 260 may identify whether at least any one of a first refueling hose 211 or the second refueling hose 212 is available. The refueling controller 260 may identify whether a refueling hose connected with the remaining interface except for the interface selected by the user of the first vehicle 300 is available. For example, the refueling controller 260 may identify whether the second refueling hose 212 connected with the second interface 232 which is not selected by the user of the first vehicle 300 is available.

In S102, the refueling controller 260 may control a display environment of the remaining interface except for the interface selected by the user of the first vehicle 300. The refueling controller 260 may display icons corresponding to a first multi-refueling mode and a second multi-refueling mode except for the single refueling mode of the second interface 232 which is not selected by the user of the first vehicle 300 to be in an inactive state. Therefore, while the first vehicle 300 is refueled, a user of an additional vehicle to be refueled using a second refueling hose of the same dispenser as the first vehicle 300 may select the single refueling mode, but may fail to select the first multi-refueling mode and the second multi-refueling mode.

In addition, when a first receptacle 321 of the first vehicle 300 and a first nozzle 221 are fastened with each other, the refueling controller may obtain characteristic 260 information of the first vehicle 300, which is received through a first communication device 251. Additionally, the refueling controller 260 may operate in the single refueling mode without the selection of the user of the first vehicle 300 through the interface.

In S103, the first refueling hose 211 of the dispenser 210 which operates in the single refueling mode may be fastened with a first receptacle 321 of the first vehicle 300. The user of the first vehicle 300 may also select the second refueling hose 212, and the selected second refueling hose 212 may be fastened with the first receptacle 321. A description is given of an example of a structure in which the first refueling hose 211 and the first receptacle 321 of the first vehicle 300 are fastened with each other.

In S104, when the first nozzle 221 of the first refueling hose 211 is fastened with the first receptacle 321 of the first vehicle 300, the refueling controller 260 may inspect a refueling environment of the first vehicle 300. The refueling controller 260 may momentarily open and then close an integrated valve 243 and a first valve 241 to initialize a refueling environment of the single refueling mode using the first nozzle 221. The refueling controller 260 may inspect a connection state, a communication state, whether hydrogen is leaked, and the like between the first nozzle 221 and the first receptacle 321. The refueling controller 260 may identify an amount of required hydrogen desired for refueling the first vehicle 300 and the hydrogen pressure and temperature in a first fuel tank 311 of the first vehicle 300 through communication with the first vehicle 300.

When it is determined that there is no problem with the refueling environment of the first vehicle 300, in S105 and S106, the refueling controller 260 may determine the first refueling protocol data based on the refueling environment. The first refueling protocol data may be calculated based on the initial parameters of the first vehicle 300 and the dispenser 210, which are identified when inspecting the refueling environment. For example, the refueling controller 260 may calculate a refueling speed (or a pressure rise rate) (an average pressure ramp rate (APRR)) and a target pressure of the first nozzle 221 based on parameters of the first vehicle 300 and the dispenser 210 (e.g., an atmospheric temperature of a refueling station, a hydrogen cooling temperature, tank design pressure of the first vehicle 300, and initial pressure). As a result, the refueling controller 260 proposes a safe refueling profile guide. Because the target pressure and the refueling speed are able to vary with a facility characteristic of a refueling station, they may be differently set for each refueling station.

In S107, the refueling controller 260 may open the first valve 241 based on the refueling speed of the first nozzle 221 and the target pressure of the first nozzle 221 in the state in which the integrated valve 243 is fully open and may adjust an opening rate of the first valve 241 in real-time. In other words, the refueling controller 260 may control the first valve 241 to refuel the first vehicle 300 with hydrogen up to the calculated target pressure at the calculated refueling speed.

In S108, the refueling controller 260 may compare target pressure PN1 of the first nozzle 221 with measurement pressure PS1 measured by a first pressure sensor P1. When the measurement pressure PS1 is less than the target pressure PN1 as a result of the comparison, the refueling controller 260 may perform a refueling process for adjusting an opening rate of the first valve 241 in real-time based on the measurement pressure PS1 measured by the first pressure sensor P1.

In S109, when the measurement pressure PS1 reaches the target pressure PSN1 or more as a result of the comparison, the refueling controller 260 may fully close the first valve 241. Then, as the first receptacle 321 and the first nozzle 221 are separated from each other, the refueling process of the first vehicle 300 may be ended.

In S101, the refueling controller 260 may determine that the second refueling hose 212 is unavailable and the first refueling hose 211 is available. When a user of another vehicle, who starts to refuel the other vehicle earlier than the first vehicle 300, uses the second refueling hose 212, the refueling controller 260 may determine the second refueling hose 212 as an unavailable state.

Because the second refueling hose 212 is unavailable (S101—No), in S110, the first refueling hose 211 of the dispenser 210 which operates in the single refueling mode may be fastened with the first receptacle 321 of the first vehicle 300.

When the first nozzle 221 of the first refueling hose 211 is fastened with the first receptacle 321 of the first vehicle 300, in S111, the refueling controller 260 may inspect a refueling environment of the first vehicle 300. The refueling controller 260 may momentarily open and then close the first valve 241 to initialize a refueling environment of the single refueling mode using the first nozzle 221. At this time, because another vehicle except for the first vehicle 300 proceeds with being refueled through the second refueling hose 212, the integrated valve 243 may be in an open state and the second valve 242 may be in a state in which an opening rate is adjusted in real-time.

The refueling controller 260 may inspect a connection state, a communication state, whether hydrogen is leaked, and the like between the first nozzle 221 and the first receptacle 321. The refueling controller 260 may identify an amount of required hydrogen refueling of the first vehicle 300 and the hydrogen pressure and temperature in the first fuel tank 311 of the first vehicle 300 through communication with the first vehicle 300.

When the refueling environment of the first vehicle 300 is initialized, in S112 and S113, the refueling controller 260 may determine single refueling protocol data (or first refueling protocol data) based on the refueling environment. The single refueling protocol data may be calculated based on initial parameters of the first vehicle 300 and the dispenser 210, which are identified when inspecting the refueling environment. For example, the refueling controller 260 may calculate a refueling speed (or a pressure rise rate) (an APRR) and a target pressure of the first nozzle 221 based on parameters of the first vehicle 300 and the dispenser 210 (e.g., an atmospheric temperature of a refueling station, a hydrogen cooling temperature, tank design pressure of the first vehicle 300, and initial pressure). As a result, the refueling controller 260 proposes a safe refueling profile guide. Because the target pressure and the refueling speed are able to vary with a facility characteristic of a refueling station, they may be differently set for each refueling station.

In S114, the refueling controller 260 may open the first valve 241 based on the refueling speed of the first nozzle 221 and the target pressure of the first nozzle 221 and may adjust an opening rate of the first valve 241 in real-time. In other words, the refueling controller 260 may control the first valve 241 to refuel the first vehicle 300 with hydrogen up to the calculated target pressure at the calculated refueling speed. The refueling controller 260 may deliver a flow rate to the first nozzle 221 and the second nozzle 222 while the integrated valve 243 is fully open.

In S115, the refueling controller 260 may compare the target pressure PN1 of the first nozzle 221 with measurement pressure PS1 measured by the first pressure sensor P1. When the measurement pressure PS1 is less than the target pressure PN1 as a result of the comparison, the refueling controller 260 may perform a refueling process for adjusting an opening rate of the first valve 241 in real-time based on the measurement pressure PS1 measured by the first pressure sensor P1.

In S116, when the measurement pressure PS1 reaches the target pressure PSN1 or more as a result of the comparison, the first valve 241 may be fully closed. Then, as the first receptacle 321 and the first nozzle 221 are separated from each other, the refueling process of the first vehicle 300 which is refueled with hydrogen fuel at a constant speed through the first nozzle 221 may be ended.

Figure 4:
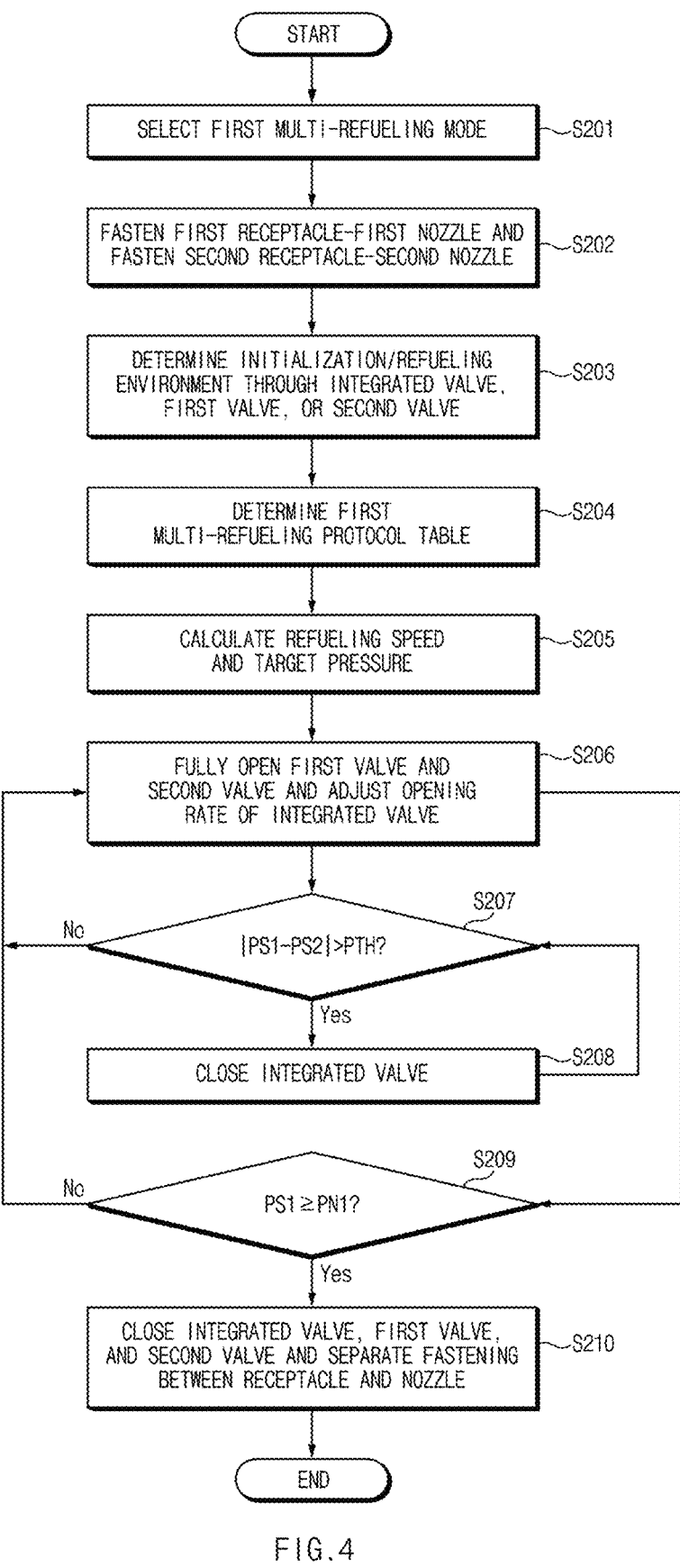
FIG. 4 is a flowchart describing a refueling method of a refueling system for operating in a first multi-refueling mode according to an embodiment of the present disclosure.

FIG. 4 is a flowchart describing a refueling method of a refueling system for operating in a first multi-refueling mode according to embodiments of the present disclosure.

In S201, as a first multi-refueling mode is selected on any one of a first interface 231 or a second interface 232 by a user of a second vehicle 400 which is a first multi-receptacle vehicle, a dispenser 210 may operate in the first multi-refueling mode. At this time, the first and second interfaces 231 and 232 may provide screens on which icons respectively corresponding to a single refueling mode, the first multi-refueling mode, and a second multi-refueling mode are displayed in an active state.

In S202, a first nozzle 221 of a first refueling hose 211 of the dispenser 210 and a second nozzle 222 of a second refueling hose 212 of the dispenser 210 may be fastened with a plurality of second receptacles 421 and 422 of the second vehicle 400, respectively. When the second vehicle 400 and the dispenser 210 are connected with each other in S202, without S201, characteristic information of the second vehicle 400 may be delivered to a refueling controller 260 through first communication devices 251 and 252.

When the second receptacles 421 and 422 of the second vehicle 400 and the nozzles 221 and 222 are fastened with each other, in S203, the refueling controller 260 may inspect a refueling environment of the second vehicle 400. The refueling controller 260 may momentarily open and then close an integrated valve 243, a first valve 241, and a second valve 242 to initialize a refueling environment of the first multi-refueling mode using the first nozzle 221 and the second nozzle 222. The refueling controller 260 may inspect a connection state, a communication state, whether hydrogen is leaked, and the like between each of the first nozzle 221 and the second nozzle 222 and the plurality of second receptacles 421 and 422. The refueling controller 260 may identify an amount of required hydrogen desired for refueling the second vehicle 400 and the hydrogen pressure and temperature in second fuel tanks 411 and 412 of the second vehicle 400 through communication with the second vehicle 400.

When the refueling environment of the second vehicle 400 is initialized, in S204 and S205, the refueling controller 260 may determine the first multi-refueling protocol data (or second refueling protocol) based on the refueling environment. The first multi-refueling protocol data may be calculated based on the initial parameters of the second vehicle 400 and the dispenser 210, which are identified when inspecting the refueling environment. For example, the refueling controller 260 may calculate a refueling speed (or a pressure rise rate) (an APRR) and a target pressure of the first nozzle 221 and the second nozzle 222 based on parameters of the second vehicle 400 and the dispenser 210 (e.g., an atmospheric temperature of a refueling station, a hydrogen cooling temperature, tank design pressure of the second vehicle 400, and initial pressure). As a result, the refueling controller 260 proposes a safe refueling profile guide. The refueling controller 260 may reflect a facility characteristic of the refueling station to calculate the target pressure and the refueling speed. For example, the refueling controller 260 may select a refueling speed changed to 2 times higher than the refueling speed calculated by reflecting the facility characteristic of the refueling station.

In S206, the refueling controller 260 may open the integrated valve 243 based on at least any one of the measurement pressures PS1 and PS2 measured by a first pressure sensor P1 and a second pressure sensor P2, refueling speeds of the first and second nozzles 221 and 222, or target pressure of the first and second nozzles 221 and 222. The refueling controller 260 may adjust an opening rate of the integrated valve 243 in real-time, in the state in which the first and second valves 241 and 242 are fully open. The refueling controller 260 may control the opening rate of the integrated valve 243 in the state in which the first and second valves 241 and 242 are open to refuel the second vehicle 400 with hydrogen up to the calculated target pressure at the calculated refueling speed.

In S207, the refueling controller 260 may compare the first measurement pressure PS1 of the first nozzle 221, which is measured by the first pressure sensor P1, with the second measurement pressure PS2 of the second nozzle 222, which is measured by the second pressure sensor P2. The refueling controller 260 may calculate an absolute value of a difference between the first measurement pressure PS1 and the second measurement pressure PS2. Additionally, the refueling controller 260 may determine whether the calculated absolute value is greater than or equal to reference pressure PTH. Because the reference pressure is able to vary with a facility characteristic of a refueling station, it may be differently set for each refueling station.

When the calculated absolute value is greater than or equal to the reference pressure PTH (S207—Yes), in S208, the refueling controller 260 may determine that flow imbalance between the first refueling hose 211 connected with the first nozzle 221 and the second refueling hose 212 connected with the second nozzle 222 occurs. In addition, when an absolute value of a difference between measurement flow rates respectively measured by first and second flow sensors F1 and F2 is greater than or equal to a reference flow rate, the refueling controller 260 may determine that the flow imbalance occurs.

When determining that the flow imbalance occurs, the refueling controller 260 may close the integrated valve 243. The refueling controller 260 may temporarily close the integrated valve 243 to synchronize pressure between the first and second nozzles 221 and 222. Internal pressure between the first refueling hose 211 and the second refueling hose 212 may be formed as the same pressure. Therefore, flow rates of hydrogen supplied through the first refueling hose 211 and the second refueling hose 212 may be adjusted to be the same as or similar to each other.

When determining that the flow imbalance does not occur, the refueling controller 260 may proceed to S209 while maintaining S206.

In S209, the refueling controller 260 may compare the target pressure PN1 of the first nozzle 221 with the measurement pressure PS1 measured by the first pressure sensor P1. When the measurement pressure PS1 is less than the target pressure PN1 as a result of the comparison (S209— No), the refueling controller 260 may continue performing the refueling process of the second vehicle 400, which is for adjusting the opening rate of the integrated valve 243 in real-time in the state in which the first valve 241 and the second valve 242 are open.

When the measurement pressure PS1 reaches the target pressure PN1 or more as a result of the comparison (S209— Yes), in S210, the first valve 241, the second valve 242, and the integrated valve 243 may be fully closed. Then, the plurality of receptacles 421 and 422 and the first and second nozzles 221 and 222 may be separated from each other, respectively. The refueling process of the second vehicle 400 which is refueled with hydrogen fuel at a high speed through the first and second nozzles 221 and 222 may be ended.

Figure 5:
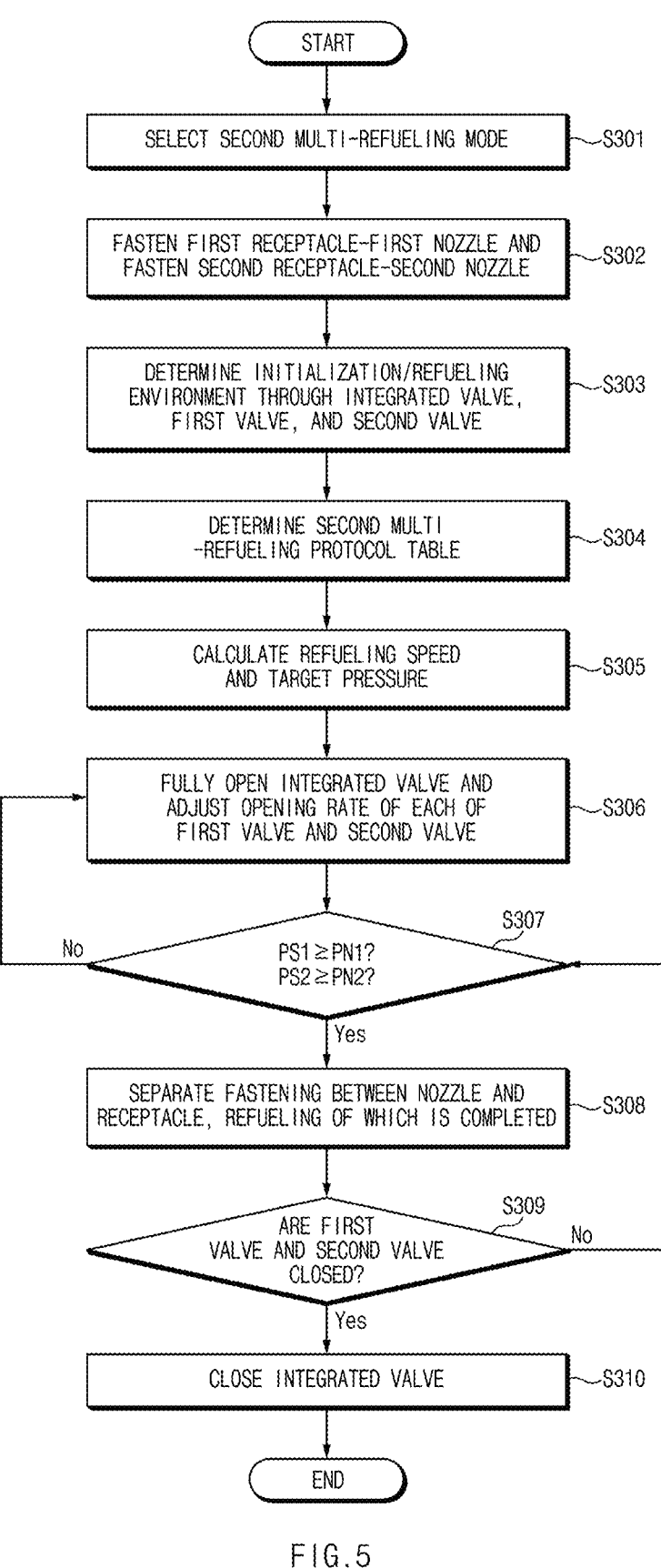
FIG. 5 is a flowchart describing a refueling method of a refueling system for operating in a second multi-refueling mode according to an embodiment of the present disclosure.

FIG. 5 is a flowchart describing a refueling method of a refueling system for operating in a second multi-refueling mode according to embodiments of the present disclosure.

In S301, as a user of a third vehicle 500 which is a second multi-receptacle vehicle selects a second multi-refueling mode on any one of a first interface 231 or a second interface 232, a dispenser 210 may operate in the second multi-refueling mode. At this time, the first and second interfaces 231 and 232 may provide screens on which icons respectively corresponding to a single refueling mode, a first multi-refueling mode, and the second multi-refueling mode are displayed in an active state.

In S302, a first nozzle 221 of a first refueling hose 211 of the dispenser 210 and a second nozzle 222 of a second refueling hose 212 of the dispenser 210 may be fastened with a plurality of third receptacles 521 and 522 of the third vehicle 500, respectively. When the third vehicle 500 and the dispenser 210 are connected with each other in S302, without S301, characteristic information of the third vehicle 500 may be delivered to a refueling controller 260 through first communication devices 251 and 252.

When the plurality of third receptacles 521 and 522 and the nozzles 221 and 222 are fastened with each other, in S303, the refueling controller 260 may inspect a refueling environment of the third vehicle 500. As an example, the refueling controller 260 may fully open an integrated valve 243, may momentarily open and then close a second valve 242, may momentarily open and then close a first valve 241, and may then fully close the integrated valve 243. As another example, the refueling controller 260 may fully open the integrated valve 243, may momentarily open and then close the second valve 242, may momentarily open and then close the first valve 241, and may then fully close the integrated valve 243. Therefore, a refueling environment of the second multi-refueling mode using the first nozzle 221 and the second nozzle 222 may be initialized. The refueling controller 260 may inspect a connection state, a communication state, whether hydrogen is leaked, and the like between each of the first nozzle 221 and the second nozzle 222 and the plurality of second receptacles 421 and 422. The refueling controller 260 may identify an amount of required hydrogen desired for refueling the third vehicle 500 and the hydrogen pressure and temperature in the third fuel tanks 511 and 512 of the third vehicle 500 through communication with the third vehicle 500.

When the refueling environment of the third vehicle 500 is initialized, in S304 and S305, the refueling controller 260 may determine second multi-refueling protocol data (or third refueling protocol data) based on the refueling environment. The second multi-refueling protocol data may be calculated based on the initial parameters of the third vehicle 500 and the dispenser 210, which are identified when inspecting the refueling environment. For example, the refueling controller 260 may calculate a refueling speed (or a pressure rise rate) (an APRR) and target pressure of the first and second nozzles 221 and 22 based on parameters of the third vehicle 500 and the dispenser 210 (e.g., an atmospheric temperature of a refueling station, a hydrogen cooling temperature, tank design pressure of the third vehicle 500, and initial pressure). As a result, the refueling controller 260 proposes a safe refueling profile guide. The refueling speed and the target pressure may be calculated for each of the first and second nozzles 221 and 222. The refueling speed and the target pressure may be differently calculated for each of the first and second nozzles 221 and 222. Because the target pressure and the refueling speed are able to vary with a facility characteristic of a refueling station, they may be differently set for each refueling station.

In S306, the refueling controller 260 may adjust an opening rate of each of the first valve 241 and the second valve 242 based on at least any one of the measurement pressures PS1 and PS2 measured by a first pressure sensor P1 and a second pressure sensor P2, refueling speeds of the first and second nozzles 221 and 222, or target pressure PN1 and PN2 of the first and second nozzles 221 and 222, in the state in which the integrated valve 243 is fully open. The refueling controller 260 may control the opening rate of each of the first and second valves 241 and 242 in the state in which the first and second valves 241 and 242 are open to refuel the third vehicle 500 with hydrogen up to the calculated target pressure at the calculated refueling speed.

In S307, the refueling controller 260 may compare the first measurement pressure PS1 of the first nozzle 221, which is measured by the first pressure sensor P1, with the first target pressure PN1 of the first nozzle 221. The refueling controller 260 may also compare the second measurement pressure PS2 of the second nozzle 222, which is measured by the second pressure sensor P2, with the second target pressure PN2 of the second nozzle 222. When the first measurement pressure PS1 is less than the first target pressure PN1 as a result of the comparison (S307—No), the refueling controller 260 may perform a refueling process of the third vehicle 500 while adjusting the opening rate of the first valve 241 in real-time. The refueling controller 260 may continue performing the refueling process of a third fuel tank 511 connected with the first nozzle 221 among a plurality of third fuel tanks 511 and 512.

When the second measurement pressure PS2 is less than the second target pressure PN2 as a result of the comparison (S307—No), the refueling controller 260 may adjust the opening rate of the second valve 242 in real-time to continue performing the refueling process of the third vehicle 500. The refueling controller 260 may continue performing the refueling process of the third fuel tank 512 connected with the second nozzle 222 through the second valve 242 among the plurality of third fuel tanks 511 and 512.

When the first measurement pressure PS1 reaches the first target pressure PN1 or more (S307—Yes), in S308, the first valve 241 may be fully closed and the fastening between the third receptacle 521 of the third vehicle 500 and the first nozzle 221 may be released. When the second measurement pressure PS2 reaches the second target pressure PN2 or more (S307—Yes), the second valve 242 may be fully closed and the fastening between the second receptacle 522 of the third vehicle 500 and the second nozzle 222 may be released.

In S309, the refueling controller 260 may identify whether the first valve 241 and the second valve 242 are closed. When at least any one of the first valve 241 or the second valve 242 is not closed (S309—No), the refueling controller 260 may perform act S307.

When all the first valve 241 and the second valve 242 are fully closed (S309—Yes), the integrated valve 243 may be fully closed. Therefore, the refueling process of the third vehicle 500 which is refueled with hydrogen fuel at the high speed through the first and second nozzles 221 and 222 may be ended.

Figure 6:
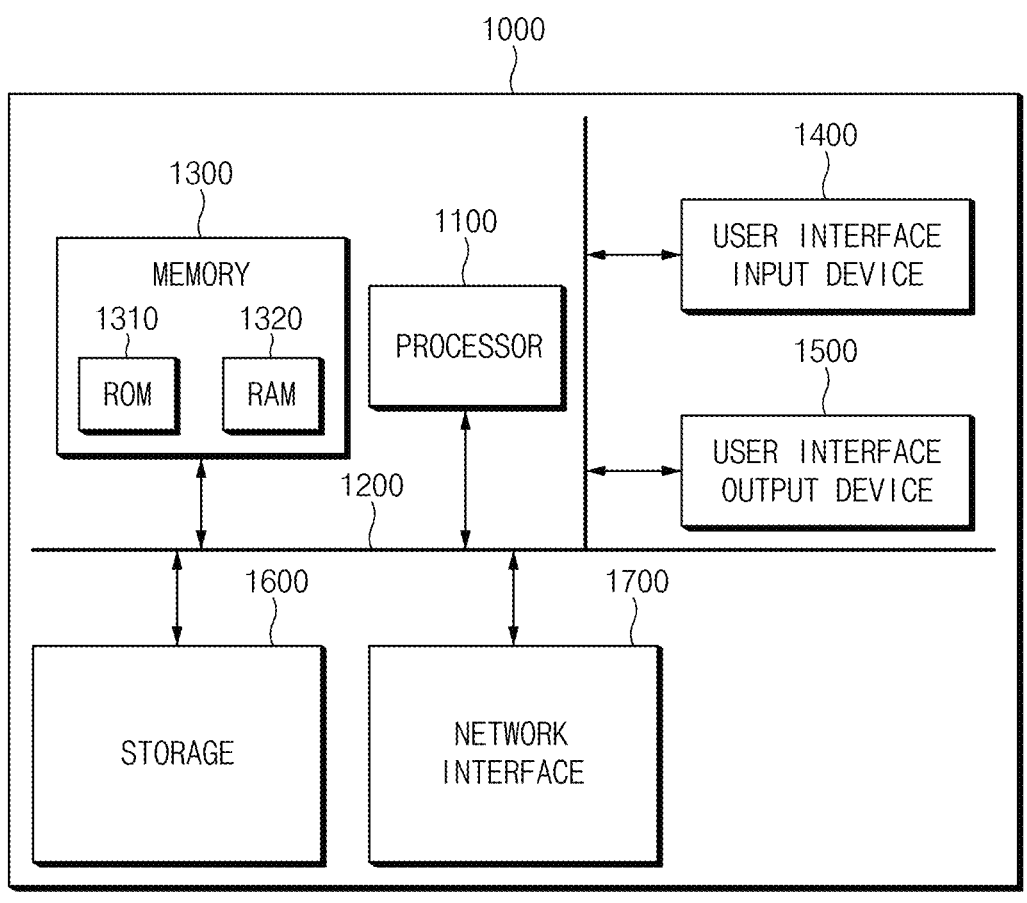
FIG. 6 illustrates a computing system according to an embodiment of the present disclosure.

FIG. 6 illustrates a computing system for executing a vehicle refueling method using a vehicle refueling system according to an embodiment of the present disclosure.

Referring to FIG. 6, the refueling method of the vehicle refueling system according to an embodiment of the present disclosure may be implemented by a computing system 1000. A computing system 1000 may include at least one processor 1100, a memory 1300, a user interface input device 1400, a user interface output device 1500, storage 1600, and a network interface 1700, which are connected with each other via a system bus 1200.

The processor 1100 may include a central processing unit (CPU) or a semiconductor device that executes processes instructions stored in the memory 1300 and/or the storage 1600. The memory 1300 and the storage 1600 may include various types of volatile or non-volatile storage media. For example, the memory 1300 may include a read-only memory (ROM) 1310 and a random access memory (/or RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory and/or the storage) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

The present technology may refuel the vehicle in an appropriate refueling mode with regard to a characteristic of the vehicle (e.g., the number of receptacles, the number of fuel tanks, the number of refueling modules, or the like) and a refueling situation (e.g., facilities of a refueling station or available information of nozzles of the refueling station).

Furthermore, the present technology may refuel the vehicle including a plurality of fuel tanks at a high speed, and may simultaneously refuel a plurality of vehicles.

In addition, the present technology may be applied to all refueling stations for refueling vehicles (e.g., autonomous driving-based robo-taxis) capable of performing autonomous driving as well as a private vehicle.

In addition, various effects ascertained directly or indirectly through the present disclosure may be provided.

Hereinabove, although the present disclosure has been described with reference to the embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the embodiments of the present disclosure are not intended to limit the technical spirit of the present disclosure, but are provided only for illustrative purposes. The scope of the present disclosure should be construed based on the accompanying claims, and all the technical ideas within the scope equivalent to the claims should be included in the scope of the present disclosure.

What is claimed is:

1. A vehicle refueling system, comprising:
a plurality of refueling hoses connected with a plurality of nozzles configured to be fastened to a vehicle;
a plurality of flow control valves installed in the plurality of refueling hoses; and
a refueling controller configured to control the plurality of flow control valves,
wherein the refueling controller is configured to
determine any one of a plurality of refueling modes based on characteristic information of the vehicle and available information of the plurality of nozzles,
determine a refueling speed and a target pressure of a fuel tank of the vehicle based on the determined refueling mode, and
adjust opening rates of the plurality of flow control valves based on the determined refueling speed and the determined target pressure, and
wherein the characteristic information of the vehicle includes:
a number of receptacles fastened with at least one of the plurality of nozzles; and
a number of refueling modules arranged between the fuel tank of the vehicle and the number of receptacles.

2. The vehicle refueling system of claim 1, wherein the plurality of flow control valves include:
a plurality of valves respectively arranged on the plurality of refueling hoses and configured to control flow rates of the plurality of refueling hoses; and
an integrated valve configured to control a flow rate of a supply pipe disposed between the plurality of valves and a fuel storage.

3. The vehicle refueling system of claim 2,
wherein the refueling controller is configured to
 determine a refueling mode as a single refueling mode,
when it is recognized that each of the number of
receptacles and the number of refueling modules is
greater than or equal to at least one and it is deter-
mined that a number of available nozzles of the
plurality of nozzles is one,
 determine the refueling mode as a first multi-refueling
mode, when it is recognized that the number of
receptacles is plural and the number of refueling
modules is less than the number of the receptacles
and it is determined that the number of the available
nozzles is plural, and
 determine the refueling mode as a second multi-refu-
eling mode, when it is determined that each of the
number of receptacles and the number of refueling
modules is plural and that the number of the avail-
able nozzles is plural.

4. The vehicle refueling system of claim 3, further com-
prising:
 an interface disposed around each of the plurality of
refueling hoses and configured to provide a screen
configured to select icons respectively corresponding to
the single refueling mode, the first multi-refueling
mode, and the second multi-refueling mode.

5. The vehicle refueling system of claim 4, wherein the
refueling controller is configured to:
 determine the refueling speed and the target pressure of
the fuel tank of the vehicle based on a refueling mode
corresponding to a selected icon, when it is determined
that the icon corresponding to any one of the single
refueling mode, the first multi-refueling mode, or the
second multi-refueling mode is selected through the
interface; and
 adjust the opening rates of the plurality of flow control
valves based on the determined refueling speed and the
determined target pressure.

6. The vehicle refueling system of claim 3, further com-
prising:
 communication devices respectively installed in the plu-
rality of nozzles,
 wherein the refueling controller is configured to
  obtain the characteristic information of the vehicle
through the communication devices, and
  obtain the available information based on a state in
which the number of receptacles of the vehicle and
the plurality of nozzles are fastened with each other.

7. The vehicle refueling system of claim 3, further com-
prising:
 a plurality of pressure sensors installed in the plurality of
refueling hoses, respectively; and
 a plurality of flow sensors installed in the plurality of
refueling hoses, respectively,
 wherein the refueling controller is configured to detect at
least any one of a pressure or a flow rate of each of the
plurality of refueling hoses by at least any one of the
plurality of pressure sensors or the plurality of flow
sensors.

8. The vehicle refueling system of claim 7, wherein the
refueling controller is configured to:
 control the integrated valve to be closed, when any one of
a pressure difference or a flow difference between the
plurality of refueling hoses is greater than or equal to a
reference value upon refueling the vehicle in the first
multi-refueling mode.

9. The vehicle refueling system of claim 3, wherein the
refueling controller is configured to:
 control any one of the plurality of valves to close a valve
connected to the vehicle among the plurality of valves,
when there is a need to stop refueling the vehicle while
refueling the vehicle in the single refueling mode;
 control the integrated valve to be closed, when there is a
need to stop refueling the vehicle while refueling the
vehicle in the first multi-refueling mode; and
 control the plurality of valves to be closed, when there is
a need to stop refueling the vehicle while refueling the
vehicle in the second multi-refueling mode.

10. A vehicle refueling method, comprising:
 determining a refueling mode, among a plurality of refu-
eling modes, based on characteristic information of a
vehicle and available information of a plurality of
nozzles fastened to the vehicle;
 determining a refueling speed and a target pressure of a
fuel tank of the vehicle based on the determined
refueling mode; and
 adjusting opening rates of a plurality of flow control
valves installed in a plurality of refueling hoses con-
nected with the plurality of nozzles based on the
determined refueling speed and the determined target
pressure,
 wherein the characteristic information of the vehicle
includes:
  a number of receptacles fastened with at least one of the
plurality of nozzles; and
  a number of refueling modules arranged between the
fuel tank of the vehicle and the number of recep-
tacles.

11. The vehicle refueling method of claim 10, wherein the
adjusting of the opening rates of the plurality of flow control
valves includes:
 adjusting opening rates of a plurality of valves respec-
tively arranged on the plurality of refueling hoses, the
plurality of valves being configured to control flow
rates of the plurality of refueling hoses; and
 adjusting an opening rate of an integrated valve config-
ured to control a flow rate of a supply pipe disposed
between the plurality of valves and a fuel storage.

12. The vehicle refueling method of claim 11, wherein the
determining of the any one of the plurality of refueling
modes includes:
 determining the refueling mode as a single refueling
mode, when it is recognized that each of a number of
receptacles of the vehicle and the number of refueling
modules of the vehicle is greater than or equal to at
least one and it is determined that a number of available
nozzles of the plurality of nozzles is one;
 determining the refueling mode as a first multi-refueling
mode, when it is recognized that the number of recep-
tacles is plural and the number of refueling modules is
less than the number of receptacles and it is determined
that the number of the available nozzles is plural; and
 determining the refueling mode as a second multi-refu-
eling mode, when it is determined that each of the
number of receptacles and the number of refueling
modules is plural and that the number of the available
nozzles is plural.

13. The vehicle refueling method of claim 12, wherein the
adjusting of the opening rates of the plurality of flow control
valves includes:
 determining the refueling speed and the target pressure of
the fuel tank of the vehicle based on a refueling mode
corresponding to a selected icon, when it is determined
that an icon corresponding to any one of the single
refueling mode, the first multi-refueling mode, or the second multi-refueling mode is selected through an interface disposed around each of the plurality of refueling hoses; and adjusting the opening rates of the plurality of flow control valves based on the determined refueling speed and the determined target pressure.

14. The vehicle refueling method of claim 12, wherein the determining of the any one of the plurality of refueling modes includes:

obtaining the characteristic information of the vehicle through communication devices respectively installed in the plurality of nozzles; and obtaining the available information based on a state in which the number of receptacles of the vehicle and the plurality of nozzles are fastened with each other.

15. The vehicle refueling method of claim 12, further comprising:

controlling the integrated valve to be closed, when any one of a pressure difference or a flow difference between the plurality of refueling hoses is greater than or equal to a reference value upon refueling the vehicle in the first multi-refueling mode.

16. The vehicle refueling method of claim 12, further comprising:

controlling any one of the plurality of valves to close a valve connected to the vehicle among the plurality of valves, when there is a need to stop refueling the vehicle while refueling the vehicle in the single refueling mode;

controlling the integrated valve to be closed, when there is a need to stop refueling the vehicle while refueling the vehicle in the first multi-refueling mode; and controlling the plurality of valves to be closed, when there is a need to stop refueling the vehicle while refueling the vehicle in the second multi-refueling mode.

* * * * *